Patented May 21, 1929.

1,713,619

UNITED STATES PATENT OFFICE.

BRYNAR JAMES OWEN, OF OXFORD, ENGLAND, ASSIGNOR TO SUGAR BEET AND CROP DRIERS LIMITED, OF LONDON, ENGLAND, A BRITISH COMPANY.

PROCESS FOR DEHYDRATING VEGETABLE SUBSTANCES OF ORGANIC CHARACTER.

No Drawing. Application filed November 5, 1927, Serial No. 231,391, and in Great Britain November 5, 1926.

The present invention relates to a process for dehydrating vegetable substances or products of organic character in masses of relatively small thicknesses by means of an artificial drying agent such as heated air, for example, root-crops and other substances or products which are usually sliced or disintegrated for treatment and which are frequently liable to be injured by excessive heat.

The artificial dehydration of a mass of material of the above said character in masses of relatively large thicknesses is dealt with in my prior Patent No. 1,579,239, of April 6, 1926, wherein is described a dehydrating process which consists essentially in supplying an artificial drying agent, such as heated air, to the mass of material under treatment at ranges of temperature, pressure and volume which are determined or selected and co-ordinated to counteract or retard the consolidation of the said mass of material and promote or accelerate the natural reactions occurring therein so that the rate of dehydration is increased to the greatest possible extent and the effects of exothermic reactions are utilized to the best possible advantage.

When the material, however, is treated in masses of relatively small thicknesses, the consolidation of the material and the effects due thereto depend in a large degree upon and vary to a considerable extent with the particular conditions under which the treatment is effected. Thus, for instance, when the material is treated in the form of a stationary vertical column or wall, the amount of consolidation is proportional to the height of the particular column or wall, whereas, when the material is treated in the form of a horizontal layer or bed, whether at rest or in motion, the amount of consolidation is limited by the depth or thickness of the particular layer or bed, with the result that the effects of consolidation are materially reduced and practically negligible in the case of a comparatively thin layer or bed. Whether the material be treated in the above said forms, or in the form of a descending mass which is progressively dried during the travel thereof, the treatment of the material is more materially affected by the amount of subsidence or shrinkage and the changes in porosity or permeability, due to heating and drying, which take place in the mass or layer of material.

The exothermic reactions, on the other hand, which are produced by natural causes dependent upon the physiological condition of the material itself and upon the presence of moisture therein, occur irrespectively of the various forms of treatment as aforesaid, although the extent to which the said reactions occur, apart from the period of time over which the treatment is extended, depends upon and varies with the depth or thickness of the mass or layer of material, with the result that the effects produced by the said reactions are also appreciably reduced in the case of a comparatively thin layer or mass. The manner, however, in which these limited or curtailed exothermic reactions take place within the mass or layer of material is governed by the manner in which the air is supplied thereto; as the air is almost invariably caused to traverse the depth or thickness of material, whether continuously through the entire mass or at intervals through successive portions thereof, the said reactions take place within the cooler portions of the said mass or layer in substantially parallel zones or strata, either vertical or horizontal, according as to whether the material is treated, whether at rest or in motion, in the form of a column or wall or in that of a layer or bed.

It has been found, however, that the artificial dehydration of organic vegetable substances or products in masses of relatively small thicknesses, in spite of the influence as aforesaid of the form of treatment on the effects of consolidation and of exothermic reactions, can nevertheless be successfully effected by means of an appropriately balanced process which is based upon certain specific factors primarily dependent upon the composition and properties of the material to be treated or the nature of the ultimate product thereof.

The dehydrating process according to this invention consists essentially in so determining or selecting and co-ordinating or proportioning the conditions as to temperature, volume and pressure under which an artificial drying agent, such as heated air, is passed through the material, the depth or thickness of material which is so traversed, and the time during which the material is subjected to the action of the said agent or air, that the material, in all forms of treatment, is dehydrated with the maximum economy and to the best advantage and is not heated to a dangerous or injurious temperature during the course of the process.

The degree of economy of the dehydrating operation is influenced to a large extent by the particular form of treatment to which the material is subjected, the efficiency of the said operation depending mainly upon and varying directly with the temperature whereat the air is discharged from the material and the degree of saturation whereat the air is so discharged. The air, however, cannot be discharged at a comparatively high exit temperature and degree of saturation without employing a correspondingly high initial temperature which would, in most cases, be dangerous or injurious to the material or to the ultimate product thereof. The temperature of the air can nevertheless be considerably increased, and the economy of the dehydrating operation can therefore be materially enhanced, by treating the material in quantities which are kept in continuous or intermittent motion during the course of treatment and by causing the air to pass at intervals through the depth or thickness of the material so that the latter during its travel or displacement is dried in successively progressive stages, the air being first supplied to the driest material and finally discharged through the wettest material and being reheated to suitably higher temperatures between its successive traverses of the material. Thus, the surface-moisture of the material can be rapidly removed at relatively high temperatures, which would otherwise be dangerous or injurious, and the moisture-content in the material can subsequently be effectively and safely reduced to the requisite percentage at progressively lower temperatures.

The highest permissible temperature or temperatures at which the heated air is supplied to the material during the course of the process depend, therefore, on the particular nature of the material under treatment or of the ultimate product thereof and on the particular form of treatment to which the said material is subjected. Thus, when the material is treated in the form of a stationary column or wall or in that of a stationary layer or bed and the air is passed continuously through the depth or thickness of the entire mass, the initial temperature is perforce limited to the dangerous or critical temperature to which the particular material may be safely heated. Again, when the material is treated in continuous or intermittent motion and the air is passed at intervals through successive portions thereof as aforesaid, although the initial temperature for the first traverse of the air is still limited by the likelihood of damage to the material, the subsequent temperatures for the remaining traverses of the air can nevertheless be safely raised to higher and higher limits, so long as these higher limits of temperature are regulated according to the degree of moisture present in the material wherewith the air successively comes in contact. Further, when the material is stirred or mixed during the course of treatment, the temperatures whereat the air is supplied thereto can be safely raised to still higher limits dependent upon the degree to which the material is stirred or mixed and the extent to which fresh surfaces or portions thereof are continually exposed to the action of the heated air. The supply temperature or temperatures should, in all cases, be such that, after the surface-moisture of the material has been removed, the transfer of heat from the air to the material does not exceed the heat absorbed by the evaporation of moisture by an extent which would cause an undue heating of the material for the particular moisture-content present therein.

The advantageousness with which the material is dehydrated, apart from the particular nature thereof, is mainly governed by the period of time over which the treatment is extended, especially in cases where the material is subject to deterioration from natural causes or from exposure to heat. The time during which the material is subjected to the action of the heated air is then determined and regulated by the extent to which and the rapidity with which the particular material deteriorates and by the detrimental effects produced thereby on the material itself or on the final product to be obtained therefrom. In the case of a material which thus deteriorates at a relatively rapid rate, therefore, the time of treatment should be reduced to the shortest period, or the rate of dehydration should be accelerated to the highest limit, which it is possible to employ without causing any deleterious effects on the material or on the ultimate product thereof. The degree of advantageousness of the dehydrating operation, consequently, is again appreciably influenced by the particular form of treatment, and can also be considerably enhanced by treating the material in continuous or intermittent motion and by passing the air at intervals through successive portions thereof as aforesaid. Thus, more than half of the total moisture present in the material can be removed during the last traverse of the air through the fresh material, and the detrimental effects produced by deterioration, which are generally directly proportional to the quantity of moisture-content, can be more rapidly eliminated without adverse effect.

The volume of heated air supplied to the material is determined by the weight of air of a given humidity and at a permissible supply temperature or temperatures as aforesaid which is necessary to remove the required amount of moisture from the quantity of material under treatment in the time during which the latter is subjected to the action of the heated air. The volume, therefore, depends on the particular exit temperature whereat the air is discharged in a state of saturation and on the requisite time or rate of dehydration. The volume for a given time or rate of dehydration can, consequently, be reduced in proportion to the degree to which the exit temperature of the saturated air may be increased, or conversely, for a given volume, the time or rate of dehydration can be correspondingly reduced or accelerated in the same relation. Should a volume of heated air substantially smaller than that as abovesaid be utilized, the time of dehydration would be increased, and the rate of dehydration would be retarded, to an extent which would prejudicially effect the material itself or the product thereof; while an unduly larger volume, on the other hand, would not produce an effective saturation of the air on discharge and would necessitate the employment of a greater motive power to no useful purpose, with the result that the thermal and mechanical efficiency of the process would be materially reduced.

The depth or thickness of material to be traversed by the heated air is primarily influenced by the composition of the particular material as affecting the resistance offered thereby to the passage of the air. The resistance of the material depends upon its porosity or permeability and upon the effects thereon of the shrinkage of the material during the course of treatment, the said effects producing almost invariably an increase in porosity or permeability proportionate to the amount of shrinkage taking place; the porosity or permeability of the particular material, further, is generally so affected by the size to which and the shape in which the material is sliced or disintegrated for treatment, that the said property thereof can also be enhanced by a proper adjustment of these latter factors or quantities. The depth or thickness for a given material can, consequently, be increased in proportion to the extent to which the porosity or permeability of the material may be increased. The depth or thickness of material, however, apart from the foregoing considerations, should be such that the heated air passing through the material under the aforesaid conditions as to temperature and volume is discharged therefrom in a state of saturation at the highest attainable exit temperature during the whole or the greater part of the period of time over which the treatment is extended. Should a depth or thickness of material substantially smaller than that as abovesaid be employed, a satisfactory degree of saturation of the discharged air would not be obtained; while a depth or thickness materially exceeding the correct one, on the other hand, would unduly increase the time of dehydration and reduce the exit temperature of the air during the early stage of the process, and would result in the possible production of condensation in the outer layers of material and of adverse effects on the material itself or the product thereof.

The pressure under which the heated air is supplied to the material is determined by the power which is necessary to drive a volume of air as aforesaid through the material in the time during which the latter is subjected to the action of the heated air. The pressure, therefore, depends on the resistance due to the particular depth or thickness of material, as affected by porosity or permeability as aforesaid, and on the requisite velocity of the air therethrough. The pressure for a given depth or thickness of material and velocity of air can, consequently, be reduced in proportion to the extent to which the resistance of the material may be decreased, or conversely, for a given pressure, the depth or thickness of material, or the velocity of air, can be correspondingly increased in the same relation.

It will be readily seen, therefore, that all the hereinbefore considered factors or conditions are so closely inter-related or interdependent, that their appropriate determination or selection and co-ordination or proportion as aforesaid is essential for ensuring the most advantageous and economical dehydration of the material, and that any radical or substantial departure therefrom would unbalance the whole process and impair its effectiveness.

In order that the determination and co-ordination according to the said invention of the above-discussed factors or conditions in the cast of a particular material of the aforesaid character may be more clearly understood and readily carried into effect, the application of the process to the dehydration of sugar-beet for the production of sugar therefrom will now be fully considered by way of example.

The following data or facts concerning sugar-beet, dependent upon the composition and properties of the material and the nature of the product thereof, can be ascertained from general knowledge or determined by experiment. Sugar-beet in a state of moisture should not be heated to a temperature exceeding 220 degrees Fahrenheit in order to avoid producing adverse effects on the sugar-content of the material, the rate of formation of invert-sugar being a product of temperature and moisture. The beets, after harvesting, are subject, especially when sliced or cut into cossettes, to natural decomposition and deterioration in the presence of moisture at a rate which is so rapid that the material should be treated almost immediately after slicing or cutting. As the amount of invert-sugar formed is a product of temperature and moisture and of time and would be increased by at least 50 per cent if the time of treatment be doubled, the dehydrating operation should be accelerated as much as possible without however raising the temperature of the beet above the aforesaid dangerous or critical temperature. Satisfactory results will be obtained by extending the treatment in any one case over a period of time which does not much exceed one hour and which should preferably be further reduced in duration; it has been found that any quantity or weight of beet-cossettes as usually subjected to treatment can be economically and advantageously dehydrated in the course of 45 minutes. As regards porosity or permeability, the natural resistance offered by the cossettes to the passage of the heated air is materially affected by their shrinkage during the course of the dehydrating operation, the shrinkage after drying being in the neighbourhood of 50 per cent, and the resistance during drying decreasing gradually with the reduction of moisture-content to approximately 25 per cent of the original resistance. The porosity or permeability of the material can be further increased, with a corresponding reduction in the time of treatment, by slicing or cutting the beets into thin ridge-tile shaped cossettes, the surface of material exposed to the air per unit weight being thus increased to the greatest possible extent.

When the beet is treated at rest, whether in the form of a column or wall or in that of a layer or bed, and the air is passed continuously through the depth or thickness or the entire mass, the dehydrating operation is effected to the best advantage and with the greatest economy by passing the air at a supply temperature ranging from 180 to 212 degrees Fahrenheit through a depth or thickness of material of 8 to 12 inches, it being thus possible, in the case of this form of treatment, to discharge the air from the material in a state of saturation at an exit temperature of 80 to 90 degrees Fahrenheit during a period of time ranging from one-half to two-thirds of the total duration of the process. The material can be dried in not much more than one hour to a moisture-content of 5 to 10 per cent, for the supply and exit temperatures and a depth or thickness as aforesaid, by employing a volume of air, at or brought to 50 to 60 degrees Fahrenheit saturated before heating, equivalent to from 1200 to 1400 pounds of air per minute and per ton of beet, and an initial pressure, measured by water-gauge in the air supply-duct, ranging from 1.5 to 2.5 inches and producing a velocity of the air on discharge of 230 to 280 feet per minute. Owing to the shrinkage of the material and to the changes in the porosity or permeability thereof during drying, however, the initial pressure as aforesaid can be gradually reduced, as the treatment progresses, by a proper regulation of the motive power employed for driving the air through the material, to an ultimate water-gauge pressure ranging from 0.4 to 0.7 inches, without reducing the exit velocity of the air or increasing the time of dehydration. In case the original pressure be not so reduced, the velocity of the air would gradually increase as the treatment progresses.

When the beet is treated in continuous or intermittent motion and the air is passed at intervals therethrough so that the material is progressively dried, say, in three substantially equal successive stages, the respective supply temperatures of the air for the various traverses of the material, in cases where each traverse is effected at an average or substantially constant temperature, should not much exceed 212 degrees Fahrenheit for the first traverse through the nearly dried material, 230 degrees Fahrenheit for the intermediate traverse through the partially dried material, and 260 degrees Fahrenheit for the last traverse through the fresh material. In cases, however, where the respective supply temperatures of the air are graduated or regulated for each traverse according to the progressive decrease of moisture-content produced during the period of each traverse and are thus made more directly proportional at all points to the degree of moisture present in the material, the most satisfactory results are obtained by utilizing supply temperatures which are graduated from 190 to 220 degrees Fahrenheit for the first traverse, from 220 to 250 degrees Fahrenheit for the intermediate traverse, and from 250 to 320 degrees Fahrenheit for the last traverse. For a supply of air at the aforesaid average or graduated temperatures, the dehydrating operation is effected to the best advantage and with the greatest economy by massing or piling the fresh material to a depth or thickness ranging from 5 to 9 inches, it being thus possible to discharge the air from the fresh material in a state of constant saturation at an exit temperature of 110 to 120 degrees Fahrenheit during the whole duration of the continuous process and to remove from 50 to 65 per cent of the total moisture present in the fresh material in 15 to 20 minutes. The material can be dried in 45 to 60 minutes to a moisture-content of 5 to 10 per cent, for the supply and exit temperatures and a depth or thickness as aforesaid, by employing a volume of air, at or brought to 70 to 80 degrees Fahrenheit saturated before heating, equivalent to from 450 to 600 pounds of air per minute and per ton of beet, and an initial or total pressure, measured by water-gauge in the air supply-duct, ranging from 1 to 2 inches and producing a velocity of the air on discharge of 180 to 230 feet per minute. The initial or total pressure and the exit velocity of the air, in the case of this form of treatment, are maintained at substantially the same level and rate as aforesaid throughout the course of the continuous process, although the respective pressures necessary to effect the various traverses vary of course according to the changes in the resistance of the material during the progressive drying thereof, the pressure for the first traverse being in the neighbourhood of 25 per cent of that for the last traverse. The said form of treatment, it will be seen, as compared with the previously considered stationary treatment, enables a considerably smaller volume of air to be utilized with substantially the same effect, owing to the much higher exit temperature which can be attained, and necessitates the employment of a lower total pressure or of a smaller motive power, although the air is passed three times through the depth or thickness of material.

The determination and co-ordination as hereinbefore set forth of the various factors or conditions for the treatment of beet in motion are applicable to all the forms in which the material can be so treated, for instance, whether the material is caused to descend by gravity, or is passed continuously upon a travelling conveyor or belt or successively upon three superimposed travelling conveyors or belts, or is moved in separate trays or the like, within a drying chamber or chambers. It is to be understood, however, that the above-specified supply temperatures could be proportionately increased, in the case of the last traverse through the fresh material, to a maximum of say 400 degrees Fahrenheit when the fresh material is stirred or mixed during the course of treatment, and that the material could be massed or piled, irrespectively of the form of treatment, to greater depths or thicknesses than those specified above, provided that the initial or total pressure be correspondingly increased to produce the requisite exit velocity of the air. Such an increase in the depth or thickness of material, it should be noted, would necessitate the employment of a greater motive power to no useful purpose and would, therefore, adversely affect the economy of the process and materially impair its efficiency.

What I claim is:

1. The process of dehydrating, disintegrated sugar-beets, consisting in continuously passing heated air at a substantially constant supply temperature ranging from 180 to 212 degrees Fahrenheit for approximately one hour through a stationary mass of the material 8 to 12 inches in original thickness.

2. The process of dehydrating disintegrated sugar-beets, consisting in continuously passing air at 50 to 60 degrees Fahrenheit saturated and heated to a substantially constant supply temperature ranging from 180 to 212 degrees Fahrenheit for approximately one hour through a stationary mass of the material 8 to 12 inches in original thickness at a rate ranging from 1200 to 1400 pounds of air per minute and per ton of material and under an initial water-gauge pressure ranging from 1.5 to 2.5 inches measured in the air supply-duct.

3. The process of dehydrating disintegrated sugar-beets, consisting in continuously passing air at 50 to 60 degrees Fahrenheit saturated and heated to a substantially constant supply temperature ranging from 180 to 212 degrees Fahrenheit for approximately one hour through a stationary mass of the material 8 to 12 inches in original thickness at a rate ranging from 1200 to 1400 pounds of air per minute and per ton of material and under an initial water-gauge pressure ranging from 1.5 to 2.5 inches measured in the air supply-duct, the said initial water-gauge pressure being gradually reduced during the course of dehydration to an ultimate water-gauge pressure ranging from 0.4 to 0.7 inches to maintain the exit velocity of the air at substantially the same rate throughout the process.

4. The process of dehydrating disintegrated sugar-beets, consisting in passing heated air at successive intervals through three substantially equal portions of a displaceable and progressively dried mass of the material at graduated supply temperatures ranging from 190 to 220 degrees Fahrenheit for the traverse through the nearly dried material, from 220 to 250 degrees Fahrenheit for the traverse through the partially dried material, and from 250 to 320 degrees Fahrenheit for the traverse through the fresh material.

5. The process of dehydrating disintegrated sugar-beets, consisting in passing heated air for a period of time extending from 45 to 60 minutes at successive intervals through three substantially equal portions of a displaceable and progressively dried mass of the material 5 to 9 inches in original thickness at graduated supply temperatures ranging from 190 to 220 degrees Fahrenheit for the traverse through the nearly dried material, from 220 to 250 degrees Fahrenheit for the traverse through the partially dried material, and from 250 to 320 degrees Fahrenheit for the traverse through the fresh material.

6. The process of dehydrating disintegrated sugar-beets, consisting in passing air at 70 to 80 degrees Fahrenheit saturated before heating for a period of time extending from 45 to 60 minutes at successive intervals through three substantially equal portions of a displaceable and progressively dried mass of the material 5 to 9 inches in original thickness at a rate ranging from 450 to 600 pounds of air per minute and per ton of material and under a total water-gauge pressure ranging from 1 to 2 inches measured in the air supply-duct, the air being heated to graduated supply temperatures ranging from 190 to 220 degrees Fahrenheit for the traverse through the nearly dried material, from 220 to 250 degrees Fahrenheit for the traverse through the partially dried material, and from 250 to 320 degrees Fahrenheit for the traverse through the fresh material.

7. The process of dehydrating disintegrated sugar-beets, consisting in passing air at 70 to 80 degrees Fahrenheit saturated before heating for a period of time extending from 45 to 60 minutes at successive intervals through three substantially equal portions of a displaceable and progressively dried mass of the material 5 to 9 inches in original thickness at a rate ranging from 450 to 600 pounds of air per minute and per ton of material and under a total water-gauge pressure ranging from 1 to 2 inches measured in the air supply-duct, the air being heated to graduated supply temperatures ranging from 190 to 220 degrees Fahrenheit for the traverse through the nearly dried material, from 220 to 250 degrees Fahrenheit for the traverse through the partially dried material, and from 250 to 320 degrees Fahrenheit for the traverse through the fresh material, and the said total water-gauge pressure and the exit velocity of the air produced thereby being maintained at substantially the same level and rate throughout the process.

8. The process for dehydrating vegetable substances liable to be injured by excessive heat in disintegrated form, which consists in massing the material to a thickness of 5 to 12 inches and in passing an artificial drying agent therethrough for 40 to 65 minutes at graduated temperatures and at a substantially constant volume, the temperature of the said agent being highest when passing through the fresh material and being reduced as the drying of the material proceeds and the volume of the said agent being dependent on the exit temperature whereat it is discharged from the material in a state of saturation, whereby chemical reactions of an exothermic and enzymotical nature are engendered in the said mass of material and the material is dehydrated economically and advantageously without adversely affecting the material itself and its product-content.

9. The process of dehydrating vegetable substances as claimed in claim 8, in which the temperature of the drying agent is graduated from the highest temperature which the material can safely bear when fresh to that which can be applied with safety to the said material when nearly dried, so that the rate of evaporation of moisture is at first accelerated to remove rapidly the surface-moisture of the material and thereafter retarded to afford the remaining moisture sufficient time to penetrate from the interior to the surface of the material without at any time exceeding the rate liable to cause the material to be heated to an injurious temperature.

In testimony whereof I have signed my name to this specification.

BRYNAR JAMES OWEN.